(12) United States Patent
Chen et al.

(10) Patent No.: US 11,893,948 B2
(45) Date of Patent: Feb. 6, 2024

(54) DISPLAY DEVICE

(71) Applicant: APPOTRONICS CORPORATION LIMITED, Guangdong (CN)

(72) Inventors: Chen Chen, Shenzhen (CN); Fei Hu, Shenzhen (CN); Xin Yu, Shenzhen (CN); Zuqiang Guo, Shenzhen (CN); Yi Li, Shenzhen (CN)

(73) Assignee: APPOTRONICS CORPORATION LIMITED, Guangdong (CN)

(*) Notice: Subject to any disclaimer, the term of this patent is extended or adjusted under 35 U.S.C. 154(b) by 0 days.

(21) Appl. No.: 17/578,841

(22) Filed: Jan. 19, 2022

(65) Prior Publication Data
US 2022/0180827 A1 Jun. 9, 2022

Related U.S. Application Data

(63) Continuation of application No. PCT/CN2020/102701, filed on Jul. 17, 2020.

(30) Foreign Application Priority Data

Jul. 19, 2019 (CN) .................. 201910656741.8

(51) Int. Cl.
G09G 3/22 (2006.01)
G09G 3/34 (2006.01)

(52) U.S. Cl.
CPC ..... *G09G 3/346* (2013.01); *G09G 2320/0233* (2013.01); *G09G 2320/064* (2013.01)

(58) Field of Classification Search
CPC .......... G09G 3/346; G09G 2320/0233; G09G 2320/064
See application file for complete search history.

(56) References Cited

U.S. PATENT DOCUMENTS 5,892,493 A 4/1999 Enami et al.
10,957,235 B1 * 3/2021 Buckley ............... G09G 3/2044
(Continued)

FOREIGN PATENT DOCUMENTS

CN 101208963 6/2008
CN 101414439 4/2009
(Continued)

OTHER PUBLICATIONS

International Search Report for International Application PCT/CN2020/102701, dated Sep. 28, 2020.
(Continued)

*Primary Examiner* — Michael A Faragalla
(74) *Attorney, Agent, or Firm* — Burris Law, PLLC

(57) ABSTRACT

A display device, including: a light source, used for emitting light source light; a control unit, used for controlling a drive current for the light source, the modulation period of each frame of image to be displayed comprising at least one pulse modulation period, and within the pulse modulation period, the drive current for the light source being an overshoot current so that the average luminous brightness of the light source in the modulation period reaches preset brightness; and a light modulation unit, used for modulating the light source light according to image data of the image to be displayed and the luminous brightness of the light source to obtain a modulated image.

16 Claims, 7 Drawing Sheets

(56) References Cited

U.S. PATENT DOCUMENTS

2018/0075801 A1* 3/2018 Le .................... G09G 3/3233
2019/0268069 A1* 8/2019 Nishino ............. H05B 45/50

FOREIGN PATENT DOCUMENTS

| CN | 101466186 | 6/2009 |
| CN | 103091958 | 5/2013 |
| CN | 105556586 | 5/2016 |
| CN | 106205454 | 12/2016 |
| CN | 106291925 | 1/2017 |
| CN | 106652963 | 5/2017 |
| CN | 106910449 | 6/2017 |
| CN | 107591119 | 1/2018 |
| WO | 2017187837 | 11/2017 |

OTHER PUBLICATIONS

Office Action issued in corresponding CN Application 2019106567418, dated Dec. 1, 2022, and an English Translation, 6 pages.

* cited by examiner

DISPLAY DEVICE

CROSS-REFERENCE TO RELATED APPLICATIONS

This application is a continuation of International Application No. PCT/CN2020/102701, filed on Jul. 17, 2020, which claims priority to and the benefit of CN 201910656741.8, filed on Jul. 19, 2019. The disclosures of the above applications are incorporated herein by reference.

FIELD

The present disclosure relates to the technical field of display, and in particular, to a display device.

BACKGROUND

The statements in this section merely provide background information related to the present disclosure and may not constitute prior art.

In existing digital light processing (DLP) display apparatuses, a light source emits uniform and constant source light onto a digital micromirror device (DMD). By controlling duty cycles of an "ON" state of individual mirrors in a certain modulation period in one frame of the DMD, different gray scale values of individual pixels can be achieved, where the minimum gray scale value that can be achieved depends on a modulation time corresponding to the least significant bit (LSB). Therefore, if a DLP display apparatus has a larger display bit depth, image data of a single frame of modulated image contains more LSBs. In the conventional pulse width modulation (PWM) scheme, for a DLP display apparatus with a bit depth of n, a modulation time required for a single frame of modulated image is $(2^n-1) t_{LSB}$, where $t_{LSB}$ is a modulation time corresponding to a single LSB. A larger bit depth n corresponds to a longer modulation time required for the frame of modulated image.

SUMMARY

This section provides a general summary of the disclosure and is not a comprehensive disclosure of its full scope or all of its features.

The present disclosure provides a display device, including:
  a light source, configured to emit source light;
  a control unit, configured to control a drive current of the light source, where a modulation cycle of each frame of image to be displayed comprises at least one pulse modulation period, and in the at least one pulse modulation period, the drive current of the light source is an overshoot current such that average light brightness of the light source in the modulation cycle reaches preset brightness; and
  a light modulation unit, configured to modulate the source light according to image data of the image to be displayed and light brightness of the light source to obtain a modulated image.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
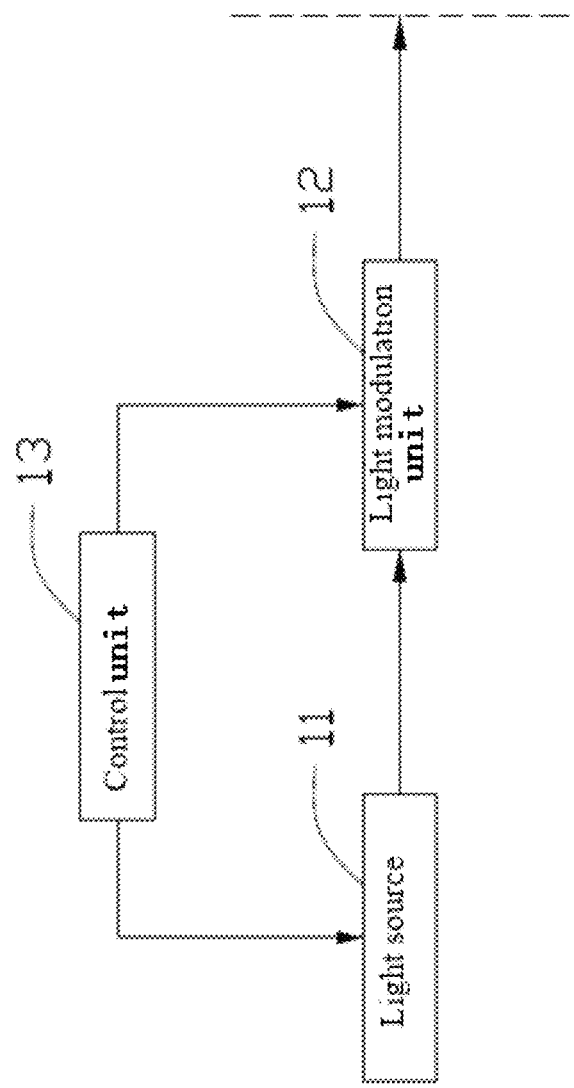
FIG. 1 is a schematic structural diagram of a display device according to some embodiments of the present disclosure.

| List of reference numerals | |
| --- | --- |
| Display device | 10 |
| Light source | 11 |
| Light modulation unit | 12 |
| Control unit | 13 |

The present disclosure is further described in the following detailed description with reference to the accompanying drawings.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure is described below in detail by using specific embodiments with reference to the accompanying drawings. It should be noted that without conflict, the embodiments of this application and features of the embodiments may be combined with each other. Many specific details are set forth in the following description to facilitate a full understanding of the present invention. The described embodiments are merely some but not all of the embodiments of the present invention. All other embodiments obtained by a person of ordinary skill in the art based on the embodiments of the present invention without creative efforts shall fall within the protection scope of the present invention.

The display device of the present disclosure may be a projector, such as a theater projector, an engineering projector, a micro projector, etc. The display device of the present disclosure may also be a laser TV.

Referring to FIG. 1, this embodiment provides a display device 10, including a light source 11, a light modulation unit 12, and a control unit 13. The light source 11 is configured to emit source light; the control unit 13 is configured to control a drive current of the light source 11; and the light modulation unit 12 is configured to modulate the source light according to image data of an image to be displayed and light brightness of the light source 11, to obtain a modulated image.

In this embodiment, the light source 11 is a laser light source 11, including a plurality of lasers.

In this embodiment, the light modulation unit 12 includes, but is not limited to, a Digital Micromirror Device (DMD), a Liquid Crystal Display (LCD), or a Liquid Crystal on Silicon (LCOS). For ease of description, the light modulation unit 12 being a DMD is used as an example, but this is not intended to limit the scope of the present disclosure. The light modulation unit 12 includes a plurality of micromirror units. Each micromirror unit corresponds to one pixel of the modulated image. When a micromirror unit is in an "ON" state, the micromirror unit reflects the source light to a corresponding pixel region, and the corresponding pixel is in a "bright" state; when the micromirror unit is in an "OFF" state, the micromirror unit does not reflect the source light to the corresponding pixel region, and the corresponding pixel is in a "OFF" state.

A modulation cycle of each image to be displayed includes at least one pulse modulation period. In the pulse modulation period, the drive current of the light source 11 is an overshoot current such that average light brightness of the light source 11 in the modulation cycle reaches preset brightness. In other words, in the pulse modulation period, the drive current of the light source 11 is higher than a rated operating current of the light source 11. When the control unit 13 controls the light source 11 to emit light in a current overshoot manner, a duty cycle of an "ON" state time of the micromirror unit in the DMD is less than 1, and the light source 11 bears higher optical power. In other words, compared with a continuous constant drive current, the overshoot current can increase the light brightness of the light source 11 during light emitting.

Specifically, a plurality of bits are used to represent gray scale values of a single frame of image to be displayed, where each bit can be regarded as a binary plane, i.e., a bit plane. Each modulation cycle includes a plurality of bit plane modulation periods, and at least one of the bit plane modulation periods includes at least one pulse modulation period. Within the bit plane modulation period, the drive current of the light source is a rated operating current and the light brightness of the light source is correspondingly L in periods other than the pulse modulation period, and in the pulse modulation period, the light brightness of the light source 11 is ML (M>1), such that light emitted by the light source 11 in the bit plane modulation period reaches a preset light amount and each pixel of the modulated image reaches a preset gray scale value. In other bit plane modulation periods including no pulse modulation period, the drive current of the light source is the rated operating current, and the corresponding light brightness of the light source is also L. In an image modulation process, the light amount of the light source 11 in each bit plane modulation period is a preset fixed value. For a certain bit plane, in the conventional PWM modulation scheme, a light amount of the light source in the bit plane modulation period is Q, a modulation time is $t_1$, and average light brightness is $L_1$; in the modulation scheme of the present disclosure, a light amount of the light source in the bit plane modulation period is still Q, the modulation time is $t_2$, and average light brightness is $L_2$. Since a pulse modulation period is added to the bit plane modulation period and light brightness of the light source 11 in the pulse modulation period is ML (M>1), the required modulation time $t_2$ is reduced while the light amount Q is unchanged, that is, $t_2 < t_1$, and the average light brightness $L_2$ is increased, that is, $L_2 > L_1$. In this embodiment, the light amount refers to an integral of luminous flux of the light source 11 over a corresponding time. In other words, the light amount in the bit plane modulation period is the total amount of light emitted by the light source 11 in the bit plane modulation period. A modulation time of the pulse modulation period depends on an actual design. In some embodiments, the modulation time of the pulse modulation period is equal to a modulation time corresponding to a least significant bit (LSB), to facilitate modulation. Definitely, the modulation time of the pulse modulation period may alternatively be an integer multiple (which is greater than or equal to 2) of the modulation time corresponding to the LSB. In this case, the number of pulse modulation periods can be reduced.

For example, one bit plane modulation period includes a modulation period corresponding to 3 LSBs, and the light brightness of the light source 11 in the bit plane modulation period is L. If the modulation period corresponding to the 3 LSBs ($t_{LSB}$ is used to represent the minimum modulation time corresponding to a single LSB) is replaced with the one pulse modulation period, the modulation time of the pulse modulation period is equal to the modulation time of the LSB and the light brightness of the light source 11 in the pulse modulation period is 3L (M=3), the amount of light emitted by the light source 11 in the bit plane modulation period remains unchanged while the modulation time is reduced by a modulation time corresponding to 2 LSBs (that is, $2t_{LSB}$). Therefore, the display device 10 in this embodiment helps reduce the modulation cycle of a single frame of image to be displayed.

In this embodiment, a modulation cycle further includes m low-brightness modulation periods (m is a positive integer). In the low-brightness modulation period, the light brightness of the light source 11 is lower than the light brightness L of the light source 11 under the rated operating current, that is, the light brightness of the light source 11 is lower than the light brightness L of the light source 11 corresponding to the bit plane modulation period without the pulse modulation period, to increase the bit depth by m bits, thereby improving the display bit depth. Specifically, the light brightness of the light source 11 corresponding to each of the m low-brightness modulation periods is $$\frac{L}{2^x} \ (1 \le x \le m \text{ and } x \text{ is an integer}).$$

When there is only one pulse modulation period in one modulation cycle, M is not less than m+1. For example, when m=2, the light brightness of the light source 11 is reduced to $$\frac{L}{2^1} \text{ and } \frac{L}{2^2}$$

respectively, such that the bit depth is increased by 2 bits.

In this embodiment, the display bit depth of the display device 10 is n+m bits (n is a positive integer). For ease of description, it is assumed that n is greater than 3. In this case, bit planes corresponding to all the bit plane modulation periods in one modulation cycle can be expressed as bit plane −m, bit plane −(m−1) . . . , bit plane −2, bit plane −1, bit plane 0, bit plane 1, bit plane 2 . . . , and bit plane n−1 respectively. Modulation times of bit plane modulation periods corresponding to bit plane 0 to bit plane n−1 are $2^0 t_{LSB}$, $2^1 t_{LSB}$ . . . , $2^{n-2} t_{LSB}$, and $2^{n-1} t_{LSB}$ respectively. For bit plane 0 to bit plane n−1, the modulation time of the light modulation unit 12 is adjusted by the control unit 13 to output different gray scale values. The light brightness of the light source 11 driven by a continuous rated current is L corresponding to bit plane 0 to bit plane n−1. Bit plane −m to bit plane −1 each correspond to a respective low-brightness modulation period. Modulation times of bit plane −m to bit plane −1 are each equal to a modulation time corresponding to an LSB. For bit plane −m to bit plane −1, the light brightness of the light source 11 is adjusted by the control unit 13 to output different gray scale values.

In the existing display device, the control unit 13 includes a plurality of bit plane modulation periods. The light brightness of the light source 11 in each bit plane modulation period is assumed to be L. If m low-brightness modulation periods are added to the modulation cycle of the existing display device, average display brightness of a single frame of modulated image will be reduced by $$\frac{1 - 1/2^m}{m}.$$

in this embodiment, the light brightness of the light source 11 can be multiplied in a current overshoot state. It is assumed that the light brightness of the light source 11 in a single pulse modulation period is ML. The pulse modulation period can be located in any one of the bit plane modulation periods corresponding to bit plane 0 to bit plane n−1. In some embodiments, M is an integer. Bit plane n−1 corresponds to the longest bit plane modulation period, which is $2^{n-1} t_{LSB}$. In some embodiments, M meets the following condition: $M \leq 2^{n-1}$. Due to the presence of the pulse modulation period, within the modulation cycle, average light brightness of the light source 11 in modulation periods in which the light brightness of the light source 11 is not L becomes $$\frac{M + 1 - 1/2^m}{m + 1} L.$$

When $M = m + 1/2^m$, average display brightness of a single frame of modulated image is L; when $M > m + 1/2^m$, the average display brightness of a single frame of modulated image is greater than L. Since M and m are integers, when $M \geq m-1$, the average display brightness of a single frame of modulated image is greater than L. Therefore, the presence of the pulse modulation period in this embodiment can compensate for the impact of the low-brightness modulation periods on the average display brightness of the modulated image.

In this embodiment, the control unit 13 controls an "ON" state or "OFF" state of the micromirror unit in the light modulation unit 12, such that the light modulation unit 12 can output any one gray scale value in $$\left\{0, \frac{1}{2^m} L, \frac{2}{2^m} L, \ldots \ldots, \frac{(2^{n+m} - 1)}{2^m}\right\} L.$$

Bit plane −m, bit plane −(m−1) . . . , bit plane −2, and bit plane −1 corresponding to the low-brightness modulation periods can achieve outputting any gray scale value in $$\left\{0, \frac{1}{2^m} L, \frac{2}{2^m} L, \ldots \ldots, \frac{(2^{n+m} - 1)}{2^m}\right\} L.$$

Because M>1, a single modulation cycle further needs a modulation period in which the light brightness of the light source 11 is L, to meet the integrity of the gray scale value set.

In terms of time, in this embodiment, the modulation cycle corresponding to a single frame of image to be displayed is $((2^n - 1 - M) + (m+1)) t_{LSB}$, and the modulation cycle corresponding to a single frame of image to be displayed is $(2^{n+m} - 1) t_{LSB}$ without the pulse modulation period. It can be seen that, the display device 10 of this embodiment helps reduce the modulation cycle corresponding to a single frame of image to be displayed, and as the value of m increases, the modulation time is reduced by a larger value.

Figure 2:
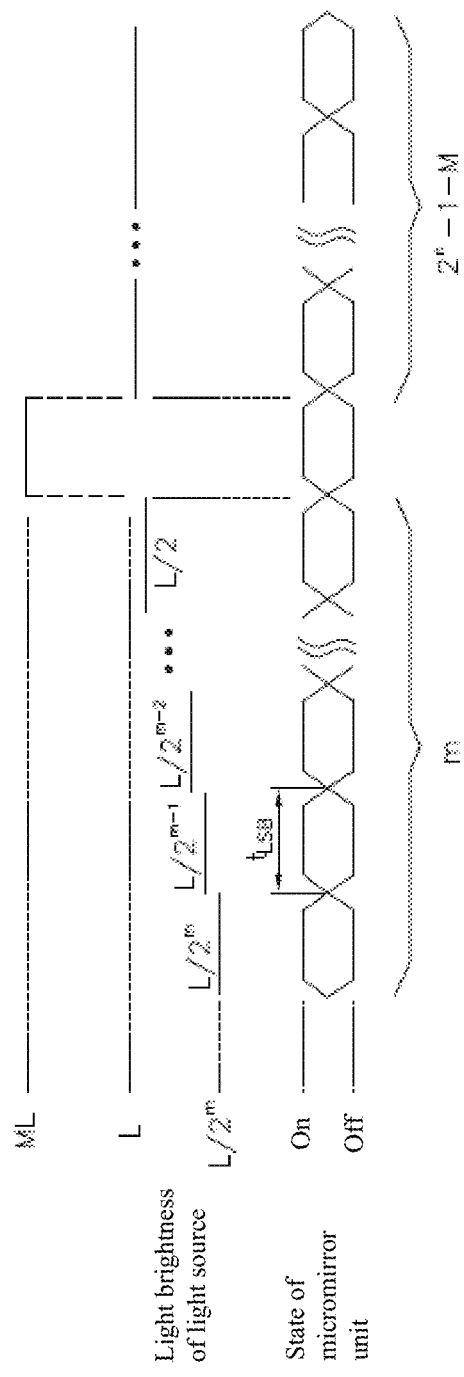
FIG. 2 is a schematic diagram of a control method of the display device according to some embodiments of the present disclosure.

Specifically, in this embodiment, when m=2, n=8, and M=3, a bit depth of (n+m)=10 bits can be achieved. Referring to FIG. 2, the light brightness of the light source 11 corresponding to the first (m+1)=3 bit plane modulation periods is $$\frac{L}{2^2}, \frac{L}{2},$$

and L. In this case, the average light brightness of the light source 11 corresponding to the (m+1)=3 bit plane modulation periods is $$\frac{3 + 1 - 1/2^2}{2 + 1} L = \frac{5}{4} L.$$

As $M = 3 < 2^2$, the pulse modulation period can be located in any one of the bit plane modulation periods corresponding to bit plane 2 to bit plane 7 (the bit plane modulation periods corresponding to bit plane 2 to bit plane 7 are each greater than $Mt_{LSB}$). If the bit plane corresponding to the bit plane modulation period in which the pulse modulation period is located is bit plane y ($2 \leq y \leq 7$ and y is an integer), the modulation time corresponding to the bit plane y is $[2^y - (M-1)] t_{LSB}$. Using bit plane 3 as an example, if the pulse modulation period is located in the bit plane modulation period corresponding to the bit plane 3, the modulation time of the bit plane modulation period corresponding to bit plane 3 changes from $2^y t_{LSB} = 2^3 t_{LSB} = 8 t_{LSB}$ to $[2^y - (M-1)] t_{LSB} = [2^3 - (3-1)] t_{LSB} = 6 t_{LSB}$. The modulation time of the bit plane modulation period corresponding to the bit plane 3 is reduced by $2 t_{LSB}$. In terms of time, a modulation time required for achieving a bit depth of 10 bits is only $255 t_{LSB}$ in this embodiment, while a modulation time required for achieving the bit depth of 10 bits by merely adding low-brightness modulation period is $257 t_{LSB}$. The display device 10 of this embodiment reduces the modulation time corresponding to a single frame of image to be displayed.

Figure 3:
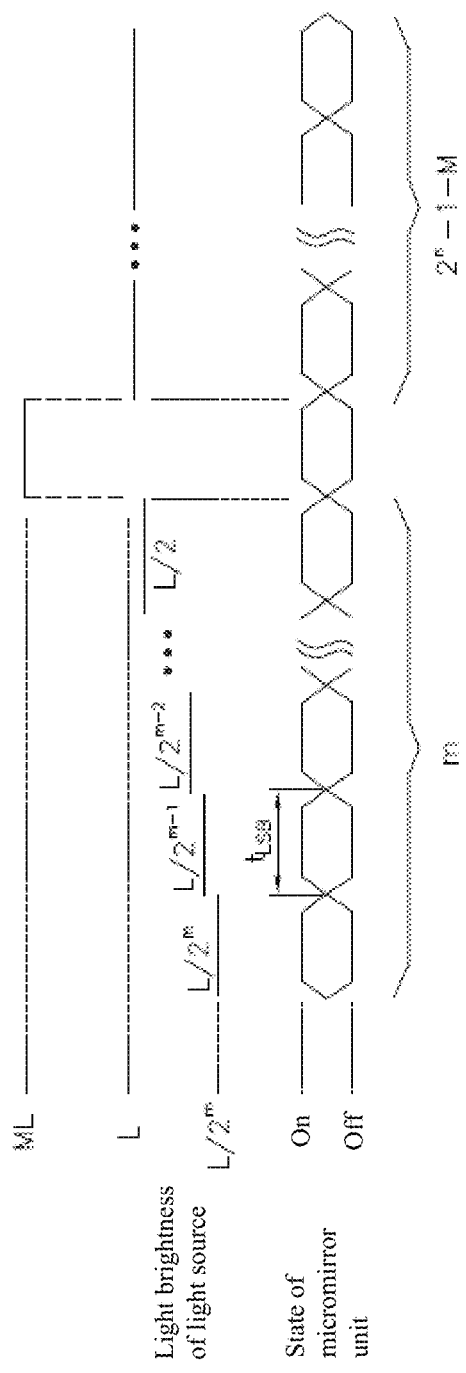
FIG. 3 is a schematic diagram of a control method of a display device according to some embodiments of the present disclosure.

In some embodiments, the display device 10 of this embodiment, as shown in FIG. 3, each modulation cycle in this embodiment includes k pulse modulation periods (k≥2 and k is an integer) instead of a single pulse modulation period.

When there are k pulse modulation periods in one modulation cycle (k≥2 and k is an integer), the light brightness distribution of the light source 11 in the pulse modulation periods is $M_jL$ (1≤j≤k and j is an integer). Therefore, in this embodiment, the light brightness of the light source 11 corresponding to the k pulse modulation periods is $M_1L$, $M_2L$ . . . , and $M_kL$ respectively, where $\Sigma_{j=1}^{k} M_j \geq m+1$. A total amount of light emitted by the light source 11 in the k pulse modulation periods of the modulation cycle reaches a preset light amount.

The light-generating material in the laser has enhanced light absorption at high optical power density, thus generating heat. The generated heat makes the light-generating material melt or recrystallize, and the phenomenon of melting or recrystallization further enhances the light absorption of the laser, thus forming a positive feedback process, which eventually causes a failure of the mirror of the laser resonant cavity and results in laser damage. This is the catastrophic optical damage (COD) of the laser.

If one modulation cycle includes only one pulse modulation period, in the case of a larger value of M, the light source 11 requires a larger overshoot current in the pulse modulation period to improve the average display brightness of the modulated image, which may cause a COD effect of the laser and thus shorten the service life of the laser. On the other hand, an excessively high overshoot current leads to excessively high light brightness of the light source 11 in the pulse modulation period. Therefore, when the modulation time corresponding to the light brightness L of the light source 11 driven by a continuous current is relatively short, it may be impossible to implement a median gray scale value between the minimum gray scale value and the maximum gray scale value.

If one modulation cycle includes a plurality of pulse modulation periods, compared with the case of only one pulse modulation period, the light source 11 can emit low-brightness light in the plurality of pulse modulation periods to achieve the same gray scale value (that is, $M_1L<ML$, $M_2L<ML$ . . . , $M_kL<ML$). Therefore, when one modulation cycle includes a plurality of pulse modulation periods, on the one hand, the impact of the overshoot current on the service life of the laser can be reduced; on the other hand, the light source 11 can emit light with relative low light brightness, and the light source 11 may emit light under an overshoot current only in some of the pulse modulation periods (for example, the light source 11 may emit light in only one pulse modulation period) to implement the median gray scale value. If one modulation cycle includes k (k≥2) pulse modulation periods, within the modulation cycle, average display brightness of the modulated image in modulation periods in which the light brightness of the light source 11 is not L is $$\frac{1 - \frac{1}{2^m} + \sum_{j=1}^{k} M_j}{m+k}.$$

In this embodiment, m=6, k=2, $M_1=3$, $M_2=4$, and n=4, which can implement a bit depth of (n+m)=10 bits. In FIG. 3, the average light brightness of the light source 11 in the first (m+2)=8 pulse modulation periods is $$\frac{1 - \frac{1}{2^6} + 3 + 4}{6+2}L = \frac{511}{512}L,$$

where $$\frac{511}{512}L$$

is approximately L. Because $M_1=3<2^2$ and $M_2=4=2^2$, a pulse modulation period in which the light brightness of the light source 11 is $M_1L$ may be placed in the bit plane modulation period corresponding to bit plane 2, and a pulse modulation period in which the light brightness of the light source 11 is $M_2L$ may be placed in the bit plane modulation period corresponding to bit plane 3. Using bit plane 2 as an example, the modulation time of the bit plane modulation period corresponding to bit plane 2 is originally $4t_{LSB}$. If the pulse modulation period in which the light brightness of the light source 11 is $M_1L=3L$ is located in the bit plane modulation period corresponding to bit plane 2, the modulation time of the bit plane modulation period corresponding to bit plane 2 can be reduced to $2t_{LSB}$ (where the pulse modulation period is included, and the amount of light emitted by the light source 11 can reach the preset light amount). Using bit plane 3 as an example, the modulation time of the bit plane modulation period corresponding to bit plane 3 is originally $8t_{LSB}$. If the pulse modulation period in which the light brightness of the light source 11 is $M_2L=4L$ is located in the bit plane modulation period corresponding to bit plane 3, the modulation time of the bit plane modulation period corresponding to bit plane 3 can be reduced to $5t_{LSB}$ (where the pulse modulation period is included, and the amount of light emitted by the light source 11 can reach the preset light amount).

In terms of time, the modulation time required for achieving a bit depth of 10 bits is $16t_{LSB}$ in this embodiment, while the modulation time required for achieving a bit depth of 10 bits is $1023t_{LSB}$ in the conventional pulse width modulation. The display device 10 of this embodiment helps reduce the modulation cycle of a single frame of image to be displayed.

In some embodiments, m=7, k=2, $M_1=2$, $M_2=4$, and n=3, which can achieve a bit depth of (n+m)=10 bits. In FIG. 3, average light brightness of the light source 11 corresponding to the first (m+2)=9 bit plane modulation periods is $$\frac{1 - \frac{1}{2^7} + 2 + 4}{7+2}L \approx \frac{7}{9}L,$$

where ⅞L is slightly lower than L. Because the bit plane modulation period corresponding to bit plane 1 is only $2t_{LSB}$, the pulse modulation period in which the light brightness of the light source 11 is 2 L can be located in the bit plane modulation period corresponding to bit plane 1. Because the bit plane modulation period corresponding to bit plane 2 is only $4t_{LSB}$, the pulse modulation period in which the light brightness of the light source 11 is 4L can be located in the bit plane modulation period corresponding to bit plane 2. The modulation time in which the light brightness of the light source 11 is L is $t_{LSB}$. In this case, in each bit plane modulation period, the light brightness of the light source 11 can be adjusted to implement different gray scale value.

In terms of time, the modulation time required for achieving a bit depth of 10 bits is $10t_{LSB}$ in this embodiment, while the modulation time required for achieving a bit depth of 10 bits is $1023t_{LSB}$ in the conventional pulse width modulation. The control method of the display device of this embodiment helps reduce the modulation cycle of a single frame of image to be displayed.

The display device 10 can improve the average display brightness of the modulated image while reducing the modulation cycle of a single frame of image to be displayed. The display device 10 makes the display brightness distribution of a single frame of modulated image more uniform over time by mixing modulation periods in which the light brightness of the light source 11 is greater than L and modulation periods in which the light brightness of the light source 11 is L, such that the display brightness distribution of a single frame of modulated image is more uniform over time.

In this embodiment, the light brightness of the light source 11 in the bit plane modulation periods corresponding to bit plane −(m−1), bit plane −(m−2) . . . , and bit plane −1 is $$\frac{L}{2^{m-1}}, \cdots, \frac{L}{2^1},$$

the modulation time corresponding to each of bit plane −(m−1) to bit plane −1 is $t_{LSB}$, and bit plane −(m−1) to bit plane −1 are called (temporally) linear bit planes.

The light brightness of the light source 11 corresponding to bit plane 0, bit plane 1 . . . , and bit plane (n−1) is constant, and the modulation times corresponding to bit plane 0 to bit plane (n−1) change in a binary exponential form. Bit plane 0 to bit plane (n−1) are called (temporally) exponential bit planes. In this embodiment, at least some of the bit plane modulation periods including no pulse modulation periods are exponential bit plane modulation periods, and a ratio between modulation times of any two adjacent exponential bit plane modulation periods is $2^g$ or $2^{-g}$, where g is a positive integer.

The light brightness of the light source 11 in the pulse modulation period is ML, and a modulation time of $Mt_{LSB}$ in the exponential bit plane modulation periods can be replaced correspondingly. Therefore, when there is only one pulse modulation period in one modulation cycle, if an exponential bit plane modulation period has z bits, the modulation time required by the z-bit exponential bit plane modulation period is only $(2^z-M+1)t_{LSB}$ (z is a positive integer).

The bit planes include bit planes having pulse modulation periods and the foregoing exponential bit planes. Each bit plane modulation period includes at least one combination unit, and each combination unit includes a predetermined number of unit modulation periods. A modulation time of each unit modulation period is equal to a modulation time corresponding to an LSB, and two adjacent combination units do not belong to the same exponential bit plane modulation period.

In this embodiment, the unit modulation period is the modulation time $t_{LSB}$ corresponding to the LSB. Combination units in different bit plane modulation periods include the same number or different numbers of unit modulation periods. For example, when the combination unit includes 2 unit modulation periods, because the bit plane modulation period corresponding to bit plane 0 is only $t_{LSB}$, the combination unit of bit plane 0 includes one unit modulation period.

The control unit 13 is further configured to sort the bit plane modulation periods according to a descending order or an ascending order of the numbers of combination units, to obtain a bit plane modulation period sequence, and uniformly insert the combination units of first bit plane modulation periods in the bit plane modulation period sequence to intervals between the combination units of the (f+1)-th exponential bit plane modulation period in a recursive manner, where f is a positive integer, 1≤f≤n−1 (f=1 . . . , n−1).

Figure 4:
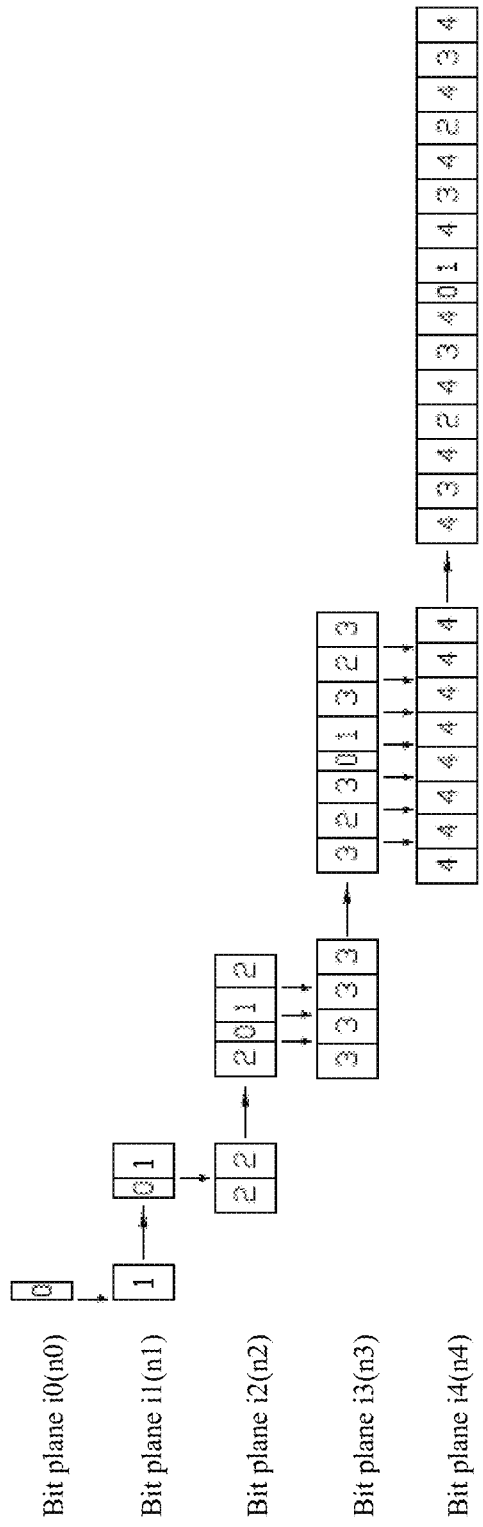
FIG. 4 is a schematic diagram of a control method of a display device according to some embodiments of the present disclosure.

As shown in FIG. 4, in this embodiment, for ease of description, it is assumed that M=1. In this embodiment, the combination unit includes 2 unit modulation periods. The modulation time corresponding to bit plane 0 is only $t_{LSB}$, and therefore there is only one (n0) combination unit, which is defined as a bit plane modulation period i0; the modulation time corresponding to bit plane 1 is $2t_{LSB}$, corresponding to one (n1) combination unit, which is defined as a bit plane modulation period i1 . . . ; the modulation time corresponding to bit plane 4 is 16 $t_{LSB}$, corresponding to 8 (n4) combination units, which are defined as a bit plane modulation period i4. First, the bit plane modulation period i0 is uniformly inserted into the bit plane modulation period i1. Because the bit plane modulation period i0 and the bit plane modulation period i1 contain the same number of combination units, a relative sequence of the combination thereof may be that the bit plane modulation period i0 is in the front or the bit plane modulation period i1 is in the front. After being combined, the bit plane modulation period i0 and the bit plane modulation period i1 form a new combination unit. Then, the combination unit formed by the bit plane modulation period i0 and the bit plane modulation period i1 is uniformly inserted into the bit plane modulation period i2. Because the bit plane modulation period i2 includes 2 combination units, by inserting the combination unit formed by the bit plane modulation period i0 and the bit plane modulation period i1 into an interval between the 2 combination units of the bit plane modulation period i2, a new sequence including 3 combination units is formed. Then, the sequence formed by the bit plane modulation period i0, the bit plane modulation period i1, and the bit plane modulation period i2 is uniformly inserted into intervals between the 4 combination units of the bit plane modulation period i3, to form a new sequence including 7 combination units. Then, the sequence formed by the bit plane modulation period i0, the bit plane modulation period i1, the bit plane modulation period i2, and the bit plane modulation period i3 is uniformly inserted into intervals between the 8 combination units in the bit plane modulation period i4. Finally, a new sequence including 15 combination units is formed.

Figure 5:
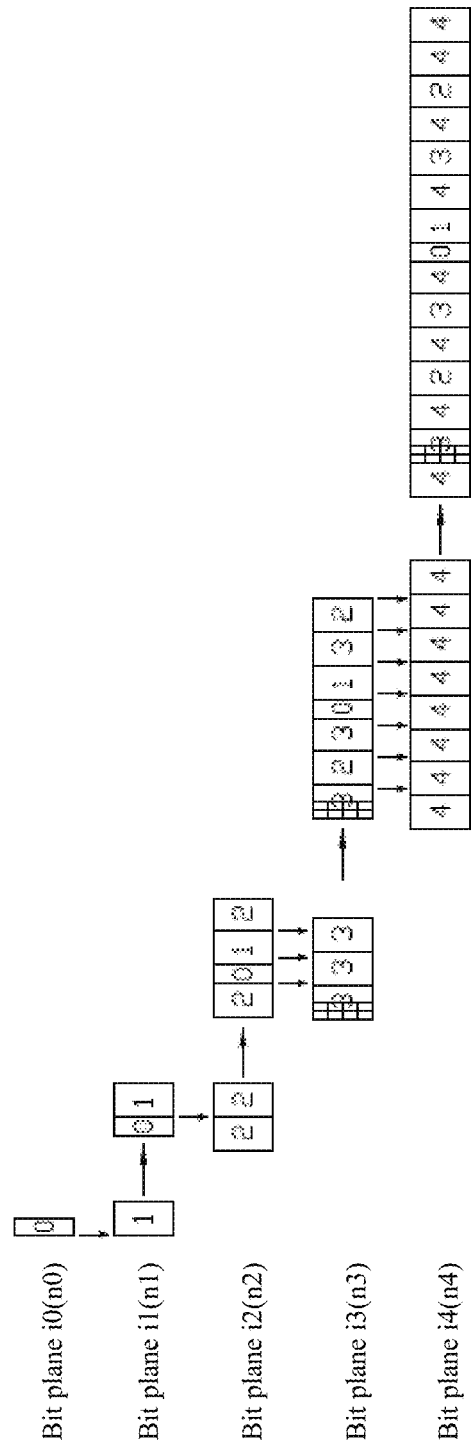
FIG. 5 is a schematic diagram of a control method of another display device according to some embodiments of the present disclosure.

In another embodiment, it is assumed that M=3. As shown in FIG. 5, the combination unit in this embodiment includes 2 unit modulation periods. The modulation time corresponding to bit plane 0 is only $t_{LSB}$, and therefore there is only one (n0) combination unit, which is defined as a bit plane modulation period i0; the modulation time corresponding to bit plane 1 is 2 $t_{LSB}$, corresponding to one (n1) combination unit, which is defined as a bit plane modulation period i1 . . . ; the modulation time corresponding to bit plane 3 is $8t_{LSB}$; because the pulse modulation period is located in the bit plane modulation period corresponding to bit plane 3, the modulation time corresponding to bit plane 3 becomes $6t_{LSB}$, corresponding to 3 (n3) combination units, which are defined as a bit plane modulation period i3; the modulation time corresponding to bit plane 4 is $16t_{LSB}$, corresponding to 8 (n4) combination units, which are defined as a bit plane modulation period i4. The bit plane modulation period i0 is uniformly inserted into the bit plane modulation period i1. Because the bit plane modulation period i0 and the bit plane modulation period i1 contain the same number of combination units, a relative sequence of the combination thereof may be that the bit plane modulation period i0 is in the front or the bit plane modulation period i1 is in the front. After being combined, the bit plane modulation period i0 and the bit plane modulation period i1 form a new combination unit. Then, the combination unit formed by the bit plane modulation period i0 and the bit plane modulation period i1 may be uniformly inserted into the bit plane modulation period i2. Because the bit plane modulation period i2 includes 2 combination units, by inserting the combination unit formed by the bit plane modulation period i0 and the bit plane modulation period i1 into an interval between different combination units of the bit plane modulation period i2, a new sequence including 3 combination units is formed. Then, the combination units after the combination of the bit plane modulation period i0, the bit plane modulation period i1, and the bit plane modulation period i2 are uniformly inserted into intervals between different combination units of the bit plane modulation period i3, to form a new sequence including 6 combination units. Then, the sequence formed by the bit plane modulation period i0, the bit plane modulation period i1, the bit plane modulation period i2, and the bit plane modulation period i3 is then uniformly inserted into intervals between 8 combination units of the bit plane modulation period i4, to finally form a sequence including 14 combination units.

Compared with the foregoing embodiments, the display device of this embodiment makes the display brightness distribution of a single frame of modulated image to be more uniform over time.

Figure 6:
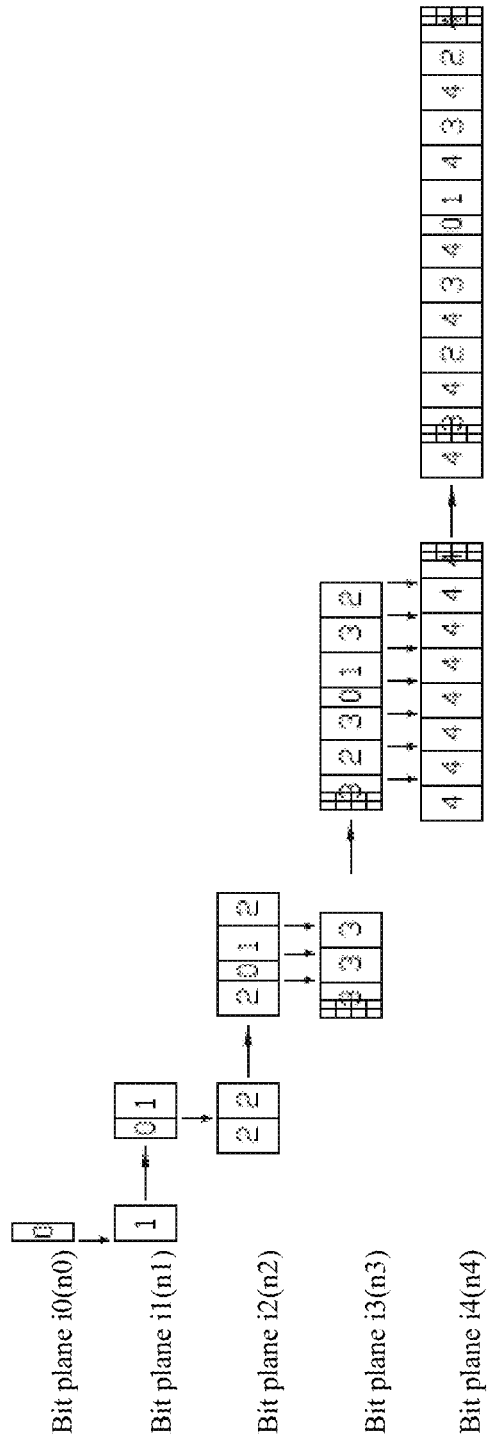
FIG. 6 is a schematic diagram of a control method of a display device according to some embodiments of the present disclosure.

In some embodiments, each modulation cycle in this embodiment includes two pulse modulation periods. It is assumed that $M_1=M_2=3$. As shown in FIG. 6, the combination unit in this embodiment includes 2 unit modulation periods. The modulation time of the bit plane modulation period corresponding to bit plane 0 is only $t_{LSB}$, and therefore there is only one (n0) combination unit, which is defined as a bit plane modulation period i0; the modulation time of the bit plane modulation period corresponding to bit plane 1 is $2t_{LSB}$, corresponding to one (n1) combination unit, which is defined as a bit plane modulation period i1 . . . ; the modulation time of the bit plane modulation period corresponding to bit plane 3 is $8t_{LSB}$; because the pulse modulation period in which the light brightness of the light source 11 is $M_1L=3L$ is located in bit plane 3, the modulation time of the bit plane modulation period corresponding to bit plane 3 becomes $6t_{LSB}$, corresponding to 3 (n3) combination units. The modulation time of the bit plane modulation period corresponding to bit plane 4 is $16t_{LSB}$; because the pulse modulation period in which the light brightness of the light source 11 is $M_2L=3L$ is located in bit plane 4, the modulation time of the bit plane modulation period corresponding to bit plane 4 becomes $14t_{LSB}$, corresponding to 7 (n4) combination units, which are defined as a bit plane modulation period i4.

The bit plane modulation period i0 is uniformly inserted into the bit plane modulation period i1. Because the bit plane modulation period i0 and the bit plane modulation period i1 contain the same number of combination units, a relative sequence of the combination of the bit plane modulation period i0 and the bit plane modulation period i1 may be that the bit plane modulation period i0 is in the front or the bit plane modulation period i1 is in the front. After being combined, the bit plane modulation period i0 and the bit plane modulation period i1 form a new combination unit. Then, the combination unit formed by the bit plane modulation period i0 and the bit plane modulation period i1 is uniformly inserted into the bit plane modulation period i2. Because the bit plane modulation period i2 includes 2 combination units, by inserting the new combination unit formed by the bit plane modulation period i0 and the bit plane modulation period i1 into the bit plane modulation period i2, a new sequence including 3 combination units is formed. Then, the sequence formed by the bit plane modulation period i0, the bit plane modulation period i1, and the bit plane modulation period i2 is uniformly inserted into the bit plane modulation period i3, to form a sequence including 6 combination units. Then, the sequence formed by the bit plane modulation period i0, the bit plane modulation period i1, the bit plane modulation period i2, and the bit plane modulation period i3 is uniformly inserted into intervals between 7 combination units in the bit plane modulation period i4, to finally form a sequence including 13 combination units.

To make two pulse modulation periods as separate as possible over time such that the display brightness distribution of a single frame of modulated image is more uniform over time, the pulse modulation period in which the light brightness of the light source 11 is $M_1L$ is put in the first combination unit of the bit plane modulation period i3, and the pulse modulation period in which the light brightness of the light source 11 is $M_2L$ is put in the last combination unit of the bit plane modulation period i4; alternatively, the pulse modulation period in which the light brightness of the light source 11 is $M_2L$ is put in the first combination unit of the bit plane modulation period i3, and the pulse modulation period in which the light brightness of the light source 11 is $M_1L$ is put in the last combination unit of the bit plane modulation period i4.

Figure 7:
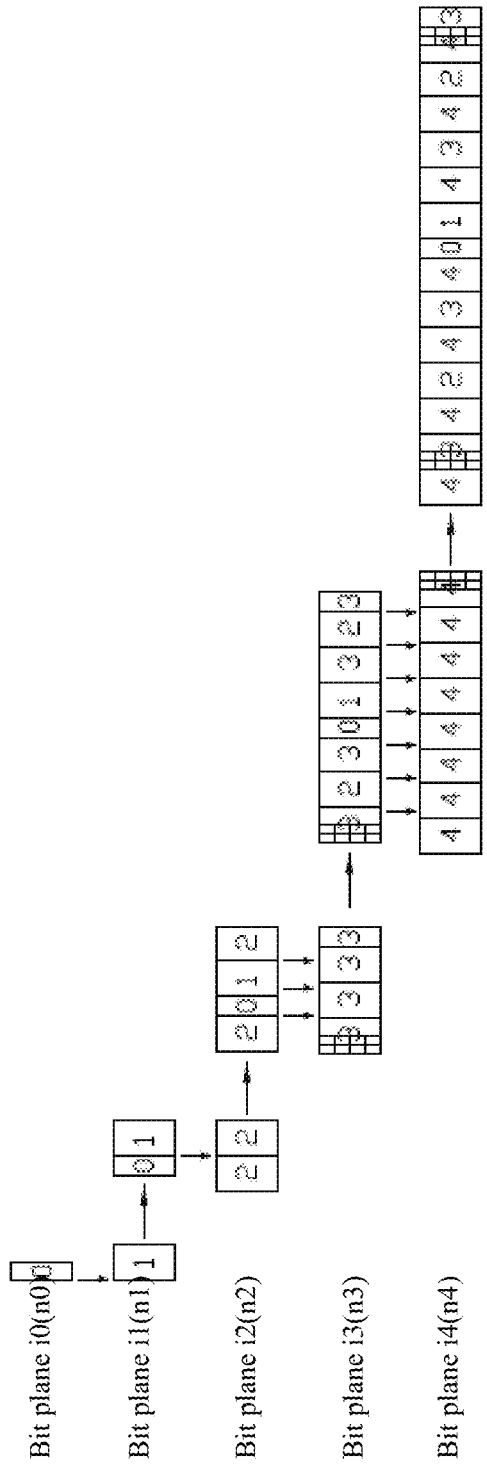
FIG. 7 is a schematic diagram of a control method of a display device according to some embodiments of the present disclosure.

In some embodiment, each modulation cycle includes two pulse modulation periods. It is assumed that $M_1=2$ and $M_2=3$. As shown in FIG. 7, the combination unit in this embodiment includes 2 unit modulation periods. The modulation time of the bit plane modulation period corresponding to bit plane 0 is only $t_{LSB}$, and therefore there is only one (n0) combination unit, which is defined as a bit plane modulation period i0; the modulation time of the bit plane modulation period corresponding to bit plane 1 is $2t_{LSB}$, corresponding to one (n1) combination unit, which is defined as bit plane modulation period i1 . . . ; the modulation time of the bit plane modulation period corresponding to bit plane 3 is $8t_{LSB}$; because the pulse modulation period in which the light brightness of the light source 11 is $M_1L=2L$ is located in bit plane 3, the modulation time of the bit plane modulation period corresponding to bit plane 3 becomes 7 $t_{LSB}$, corresponding to 4 (n3) combination units, where one combination unit includes only one unit modulation period. To separate the combination unit including one unit modulation period from the one unit modulation period in bit plane n0, the combination unit including one unit modulation period in bit plane 3 is placed at the end of the bit plane modulation period i3. The modulation time of the bit plane modulation period corresponding to bit plane 4 is $16t_{LSB}$; because the pulse modulation period in which the light brightness of the light source 11 is $M_2L=3L$ is located in bit plane 4, the modulation time of the bit plane modulation period corresponding to bit plane 4 becomes $14t_{LSB}$, corresponding to 7 (n4) combination units, which are defined as a bit plane modulation period i4.

The bit plane modulation period i0 is uniformly inserted into the bit plane modulation period i1. Because the bit plane modulation period i0 and the bit plane modulation period i1 contain the same number of combination units, a relative sequence of the combination of the bit plane modulation period i0 and the bit plane modulation period i1 may be that the bit plane modulation period i0 is in the front or the bit plane modulation period i1 is in the front. After being combined, the bit plane modulation period i0 and the bit plane modulation period i1 form a new combination unit. Then, the combination unit formed by the bit plane modulation period i0 and the bit plane modulation period i1 is uniformly inserted into the bit plane modulation period i2. Because the bit plane modulation period i2 includes 2 combination units, by inserting the new combination unit formed by the bit plane modulation period i0 and the bit plane modulation period i1 into the bit plane modulation period i2, a new sequence including 3 combination units is formed. Then, the sequence formed by the bit plane modulation period i0, the bit plane modulation period i1, and the bit plane modulation period i2 is uniformly inserted into the bit plane modulation period i3, to form a sequence including 7 combination units. Then, the sequence formed by the bit plane modulation period i0, the bit plane modulation period i1, the bit plane modulation period i2, and the bit plane modulation period i3 is uniformly inserted into intervals between 7 combination units in the bit plane modulation period i4, to finally form a sequence including 14 combination units.

The display device in some embodiments adds, to the modulation cycle corresponding to each frame of image to be displayed, the pulse modulation period in which the drive current of the light source is an overshoot current, which helps shorten the modulation cycle of a single frame of modulated image and helps improve average display brightness of a single frame of modulated image. The display device helps make the display brightness distribution of the modulated image more uniform over time.

For a person skilled in the art, it is apparent that the present disclosure is not limited to the details of the foregoing exemplary embodiments, and that the present disclosure can be implemented in other specific forms without departing from the spirit or basic features of the present disclosure. Therefore, the embodiments should be regarded as exemplary and non-limiting in every respect, and the scope of the present disclosure is defined by the appended claims rather than the above description. Therefore, all changes falling within the meaning and scope of equivalent elements of the claims should be included in the present disclosure.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A display device, comprising:
   a light source, configured to emit source light;
   a control circuit, configured to control a drive current of the light source, wherein a modulation cycle of each frame of image to be displayed comprises a plurality of bit plane modulation periods and at least one pulse modulation period; and
   a light modulation unit, configured to modulate the source light based on image data of the image to be displayed and light brightness of the light source, to obtain a modulated image;
   wherein the drive current of the light source in each of the bit plane modulation periods is a rated operating current and the light brightness of the light source is L in periods other than the at least one pulse modulation period, and, in the at least one pulse modulation period, the drive current of the light source is an overshoot current higher than the rated operating current and the light brightness of the light source is M*L (M>1), such that average light brightness of the light source in the modulation cycle reaches a preset brightness.

2. The display device according to claim 1, wherein modulation time of the at least one pulse modulation period is equal to modulation time corresponding to a least significant bit (LSB).

3. The display device according to claim 1, wherein each modulation cycle further comprises m low-brightness modulation periods (m is a positive integer), wherein in each low-brightness modulation period, the light brightness of the light source is lower than L.

4. The display device according to claim 3, wherein the light brightness of the light source in the m low-brightness modulation periods is respectively $$\frac{L}{2^x} \;(1 \le x \le m \text{ and } x \text{ is an integer}).$$

5. The display device according to claim 3, wherein modulation time of each of the low-brightness modulation periods is equal to modulation time corresponding to an LSB.

6. The display device according to claim 3, wherein when one modulation cycle comprises only one pulse modulation period, M≥m+1.

7. The display device according to claim 3, wherein when one modulation cycle comprises k pulse modulation periods (k≥2 and k is a positive integer), the light brightness of the light source in the k pulse modulation periods is $M_jL$ ($1 \leq j \leq k$ and j is a positive integer), and $\Sigma_{j=1}^{k} M_j \geq m+1$.

8. The display device according to claim 1, wherein
at least two of the plurality of bit plane modulation periods comprising no pulse modulation period are exponential bit plane modulation period, and a ratio between respective modulation time of any two adjacent exponential bit plane modulation periods is $2^g$ or $2^{-g}$, wherein g is a positive integer.

9. The display device according to claim 8, wherein
each of the plurality of bit plane modulation periods comprises at least one combination unit, each combination unit comprising a predetermined number of unit modulation periods, and modulation time of each unit modulation period is equal to modulation time corresponding to a least significant bit.

10. The display device according to claim 9, wherein
the control circuit is further configured to sort the plurality of bit plane modulation periods based on a descending order or an ascending order of the numbers of combination units, to obtain a bit plane modulation period sequence, and configured to uniformly insert the combination units of first f bit plane modulation periods of the bit plane modulation period sequence into the combination units of a (f+1)-th bit plane modulation period in a recursive manner.

11. The display device according to claim 2, wherein
at least two of the plurality of bit plane modulation periods comprising no pulse modulation period are exponential bit plane modulation period, and a ratio between respective modulation time of any two adjacent exponential bit plane modulation periods is $2^g$ or $2^{-g}$, wherein g is a positive integer.

12. The display device according to claim 3, wherein
at least two of the plurality of bit plane modulation periods comprising no pulse modulation period are exponential bit plane modulation period, and a ratio between respective modulation time of any two adjacent exponential bit plane modulation periods is $2^g$ or $2^{-g}$, wherein g is a positive integer.

13. The display device according to claim 4, wherein
at least two of the plurality of bit plane modulation periods comprising no pulse modulation period are exponential bit plane modulation period, and a ratio between respective modulation time of any two adjacent exponential bit plane modulation periods is $2^g$ or $2^{-g}$, wherein g is a positive integer.

14. The display device according to claim 5, wherein
at least two of the plurality of bit plane modulation periods comprising no pulse modulation period are exponential bit plane modulation period, and a ratio between respective modulation time of any two adjacent exponential bit plane modulation periods is $2^g$ or $2^{-g}$, wherein g is a positive integer.

15. The display device according to claim 6, wherein
at least two of the plurality of bit plane modulation periods comprising no pulse modulation period are exponential bit plane modulation period, and a ratio between respective modulation time of any two adjacent exponential bit plane modulation periods is $2^g$ or $2^{-g}$, wherein g is a positive integer.

16. The display device according to claim 7, wherein
at least two of the plurality of bit plane modulation periods comprising no pulse modulation period are exponential bit plane modulation period, and a ratio between respective modulation time of any two adjacent exponential bit plane modulation periods is $2^g$ or $2^{-g}$, wherein g is a positive integer.

* * * * *